(12) United States Patent
Lausell

(10) Patent No.: US 7,240,934 B2
(45) Date of Patent: Jul. 10, 2007

(54) SINGLE HAND OPERATED ADJUSTABLE CARRYING DEVICE AND METHOD OF USE THEREOF

(76) Inventor: Emiliano Lausell, Apto. 1204 Cond. Parque San Antonio I, Caguas, PR (US) 00725

( * ) Notice: Subject to any disclaimer, the term of this patent is extended or adjusted under 35 U.S.C. 154(b) by 117 days.

(21) Appl. No.: 11/162,064

(22) Filed: Aug. 26, 2005

(65) Prior Publication Data

US 2007/0046048 A1   Mar. 1, 2007

(51) Int. Cl.
    *B65G 7/12* (2006.01)
(52) U.S. Cl. ............... 294/16; 294/103.1; 294/104
(58) Field of Classification Search .......... 294/15, 294/16, 27.1, 28, 34, 62, 103.1, 104, 119.1; 269/6, 194
    See application file for complete search history.

(56) References Cited

U.S. PATENT DOCUMENTS

| | | | | |
|---|---|---|---|---|
| 747,181 A | | 12/1903 | Jackson | 294/62 |
| 800,341 A | * | 9/1905 | Tift | 294/62 |
| 835,376 A | * | 11/1906 | Stewart | 294/62 |
| 869,152 A | * | 10/1907 | Alline | 294/22 |
| 1,246,491 A | * | 11/1917 | Thayer | 81/3.42 |
| 1,973,269 A | * | 9/1934 | Russell | 294/34 |
| 4,055,364 A | | 10/1977 | Breite | 294/16 |
| 4,109,952 A | | 8/1978 | Monzain | 294/16 |
| 4,678,217 A | | 7/1987 | Viola | 294/16 |
| 4,929,010 A | | 5/1990 | Lahti | 294/16 |
| 4,968,077 A | | 11/1990 | Redmon | 294/16 |
| 5,871,242 A | | 2/1999 | Whitney | 294/16 |
| 6,220,638 B1 | | 4/2001 | Carroll | 294/16 |
| 6,375,237 B1 | | 4/2002 | Koenig | 294/16 |
| 6,422,620 B1 | | 7/2002 | Jordening | 294/15 |
| 6,494,513 B2 | | 12/2002 | Worthington | 294/16 |

* cited by examiner

*Primary Examiner*—Dean J Kramer

(57) ABSTRACT

An adjustable carrying device (12) includes a pair of gripping members (14, 16) in a slip joint pivot connection having a handle assembly (36) and gripping plates (20a, 20b) for grasping and handling an object. A pivotally activated/deactivated locking mechanism includes a plurality of evenly spaced teeth (66) within a guide track (54) and a cross member (76) biased between lock and unlock positions by a pair of torsion springs (74a, 74b). A pair of levers (22a, 22b) moved in unison by handle assembly (36) activate and deactivate the locking mechanism. While in unlock position a pair of coil tension springs (84) assist in the single handed adjustment of the gripping plates against the object's opposed surfaces. A subsequent upward pivotal motion of handle assembly (36) activates the locking mechanism, forcing gripping plates (20a, 20b) towards each other, firmly gripping the object prior to its lift.

19 Claims, 9 Drawing Sheets

SINGLE HAND OPERATED ADJUSTABLE CARRYING DEVICE AND METHOD OF USE THEREOF

BACKGROUND OF THE INVENTION

1. Field of Invention

This invention relates to single hand operated load carrying devices, specifically those having a pair of gripping jaws.

2. Prior Art

Of all the ancient tasks performed by humans, the employment of both human arms and hands in the grasping, lifting and carrying of objects having opposed parallel surfaces is probably one of the oldest. Even in our modern times, product distribution and delivery needs require an endless list of items to be packaged in containers meant to be carried by hand. These items include consumable goods, appliances, medicines, food, apparel, liquids, mail etc.

The manual lifting and transporting of these packages is a task built into the design of work stations and handling procedures found in common workplace. This is true even when studies show that many job related back injuries result from the application of improper or excessive effort during the performance of such tasks. Many object carrying devices have been designed to assist in the grasping, lifting and carrying of objects. However, in some instances, the devices are awkward to operate, requiring additional time or effort from the part of the end user. In other instances, the devices are invasive to the object's surfaces and their use would compromise the object's integrity or aesthetics. Let's review some of these devices.

Prior art, in the single hand operated carrying devices, concerned itself with scissor-like lifting devices with limited adjustment capability and with tools that relay on penetrating the object's surface to achieve a non-friction grip. In U.S. Pat. No. 4,109,952 to Monzain, issued on Aug. 29, 1978, a package lifter includes pivoted jaws levers for achieving flat engagement with the side walls of a package. Although such jaw levers have padded members meant to achieve a friction grip, protruding metal teeth need to be positioned underneath the package to achieve the grip. This teeth positioning under the package lends itself to be difficult and awkward. In addition, the height of the package to be lifted is limited to that of the physical length of the jaw levers.

Another example of a scissor-like device is the type of carrier tools used to carry automotive batteries. Such a device is U.S. Pat. No. 4,678,217 issued to Viola et al. Jul. 7, 1987. The carrier tool is used to grasp and carry automotive batteries employing a single hand. The scissor-like configuration of this tool conveniently utilizes the battery's own weight to produce lateral opposing forces to grip the battery. However, the metal teeth on the convex curvature of the jaw's inner surface provide an extremely limited contact surface area between the device and the battery. Substantial pressure must be concentrated at these contact points in order to hold the battery, greatly increasing the possibility of damaging the battery's surfaces. In addition, the carrier tool lacks a slip joint pivot connection of the jaw levers, which limits its use to a very narrow range of object widths.

What is needed is an easily attachable/detachable device that does not require engaging the underside of the object. Objects meant to be carried using both human arms and hands come in a variety of widths and heights. Consequently, the use of a carrying device should not be limited to a narrow range of object's heights or widths. Furthermore, a friction grip carrying device should provide a surface contact area similar to that provided by both human hands. This allows the gripping pressure to be uniformly distributed and to avoid object surface damage.

Among the prior art achieving a non-friction grip there is U.S. Pat. No. 5,871,242 issued to Whitney on Feb. 16, 1999. This lifting device comprises a pair of grips operated by a single hand and actuating a set of jaws substantially at a right angle from each other. The gripping force is not of the friction-grip type or exerted against the object's opposed surfaces. Therefore, the jaws have projections that are meant to pierce, puncture or penetrate, at some degree, the surface of the object to be lifted. Package integrity and aesthetics would be compromised by this piercing, puncturing or penetration.

An embodiment of the device requires a constant hand squeezing force to maintain the grip upon the object. Another embodiment provides a feature for locking the jaws in place, so this constant hand squeezing force is not required while transporting a carton. However, the inclusion of this feature requires two different device designs: one for right-handed persons and one for left-handed persons. Finally, the use of the device is limited to objects having a pair of flat surfaces essentially at a right angle from each other, and of a material that can be pierced, punctured or penetrated by the projections.

Another single hand operated gripping tool of the non-friction grip type is that of U.S. Pat. No. 6,375,237 issued to Koenig, Apr. 23, 2002. As with Whitney's carton lifting device, this tool relies on penetrating the carton skin to achieve a grip. It is, however, different to Whitney's carton lifting device in that a pair of gripping plates has handles meant to be squeezed together for package release. Since these handles are also used to carry the object, this configuration greatly increases the possibility of accidental opening of the gripping plates and dropping of the load while being transported.

What is needed is a carrying device that could be used to carry objects with hard surfaces, like those of a T.V. set, as well as objects having soft surfaces that should not be scratched or damaged in any way. Furthermore, it is needed a device with a standard, reliable and automatic locking mechanism that does not require a constant hand squeezing force and that will not allow the accidental release of the object during transport.

Other devices like U.S. Pat. No. 4,055,364 issued to Breite on Oct. 25, 1977, for the carrying of automotive batteries have a slip joint pivot connection of the gripping legs and a grip locking mechanism. Although the device allows the carrying of the battery using a single hand, the locking mechanism and the adjustment of the gripping legs against the battery's opposed surfaces, requires the use of both human hands.

What is needed is a non-invasive carrying device that can be adjusted and locked against the opposed parallel surfaces of an object using a single human hand. It is needed a carrying device that not only allows the single handed lifting and carrying of an object, but one that also allows a single handed release of the object after, and only when, it has been safely placed on a surface. No such device as just described is known to presently exist.

OBJECTS AND ADVANTAGES

Accordingly, several objects and advantages of the present invention are:

(1) to provide a carrying device that can be adjusted to be used for carrying objects of a wide range of widths and heights having opposed parallel surfaces which need not to be flat;
(2) to provide an adjustable carrying device which engages the object to be moved by its upper portion, eliminating the need to position any part of the device underneath the object;
(3) to provide an adjustable carrying device having a gripping contact surface area similar to that contact area provided by human hands;
(4) to provide an adjustable carrying device that can be used on objects having hard surfaces or surfaces that should not be scratched, penetrated or damaged in any way;
(5) to provide an adjustable carrying device that does not require a hand squeezing force to maintain the grip on the object or to release it;
(6) to provide an adjustable carrying device that will not allow its removal from the object being transported, until the object has been safely placed on a surface;
(7) to provide an adjustable carrying device that can be easily and effectively adjusted, attached, and detached with a single hand for the gripping, lifting and carrying of an object;

Additional objects and advantages are to provide an adjustable carrying device for carrying objects which significantly reduces the amount of physical effort and the amount of knee and back bending required from a user while gaining control of such objects, which is made of inexpensive, durable, and contamination and rust free materials to make it suitable for use in common, as well as in environmentally controlled work places.

Still further objects and advantages will become apparent from a consideration of the ensuing description and drawings.

SUMMARY

The above objectives are accomplished according to the present invention by providing an adjustable carrying device having a first and a second gripping member pivotally and slidably connected with each other and having complementary gripping plates. A handle assembly is used to pivotally move and to linearly slide one gripping member in relation to the other. A pivotally activated/deactivated locking mechanism includes a dual torsion spring assembly, carried by the first gripping member and meshing with a set of evenly spaced teeth contained within a guide track carried by the second gripping member. A pair of levers, carried by the first gripping member, are separated by a bushing and joined together by an attachment member inserted through the bushing.

One of the gripping plates joins the lower portion of the levers while the handle assembly joins the upper portion of the levers. The guide track of the second gripping member, and along which the bushing of the first gripping member spins and slides, is positioned between the levers of the first gripping member. The dual torsion spring assembly includes a cross member biased by a pair of torsion springs against the levers when the levers are pivotally moved downwards below the teeth, unlocking the adjustable carrying device. This allows the sliding of the first gripping member and the separation of the gripping plates. A pair of coil springs, joining both gripping members, keeps one gripping plate against one object's wall during the single handed inward sliding movement of the other gripping plate against the other object's wall. The cross member meshes with the teeth when the levers are pivotally moved upwards, locking the adjustable carrying device. A further upward pull on the handle assembly pivotally forces both gripping plates together securely holding the object for lifting and transport.

REFERENCE NUMERALS

Figure 1:
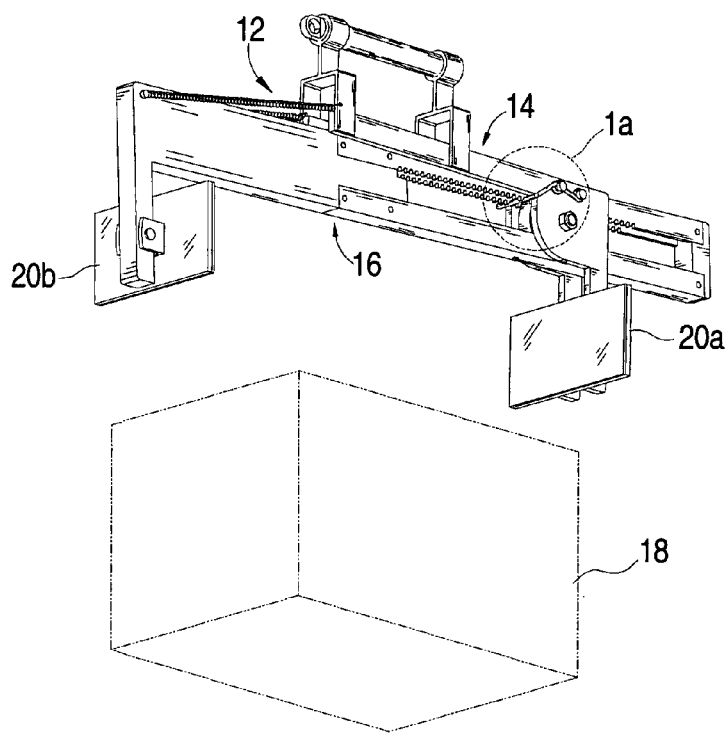
FIG. 1 is a bottom perspective view of the adjustable carrying device formed in accordance with the teachings of a preferred embodiment of the invention.
Figure 1A:
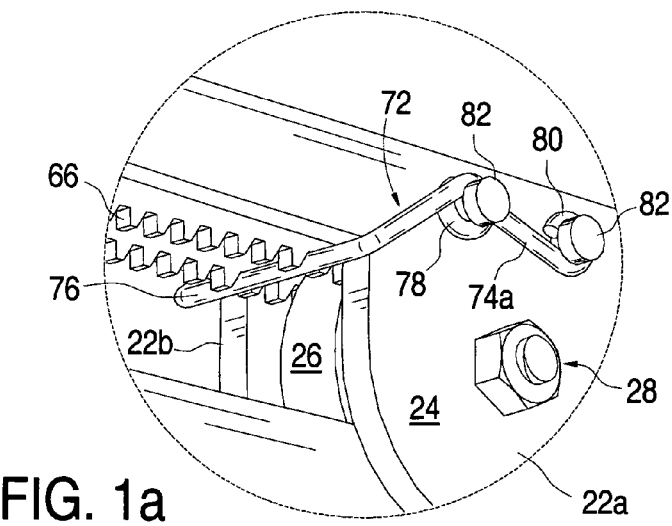
FIG. 1a is an enlarged view of the locking mechanism depicted by the dashed circle of FIG. 1. in engagement attitude when the adjustable carrying device is in "locked-relaxed" position.

12—adjustable carrying device; 14—first gripping member;

16—second gripping member; 18—object; 20a—first gripping plate;

20b—second gripping plate; 22a—first lever; 22b—second lever; 24—web; 26—bushing;

26a—bushing center portion; 28—attachment member; 28a—bolt; 28b—nut;

30—rubberized pad; 32—adhesive coating; 34a—first gripping plate mounting bracket;

34b—second gripping plate mounting bracket; 36—handle assembly; 38—handgrip;

40a—first handle bracket; 40b—second handle bracket; 42—handle bracket base;

44—handle bracket collar; 46—handle bracket neck; 48—elongated member;

48a—rectangular cutout; 50—end leg; 52—pivoting member;

54—guide track; 56—connecting member; 58—top channel member;

60—bottom channel member; 62—elongated member channeled cut-outs;

64—elongated member press-fit pins; 66—evenly spaced teeth;

68—connecting member channeled cut-outs; 70—connecting member press-fit pins;

72—dual torsion spring assembly; 74a—first torsion spring; 74b—second torsion spring;

76—cross member; 78—torsion spring eye coil; 80—torsion spring hook-ending arm;

82—torsion springs mounting rivets; 84—coil springs;

86—coil springs mounting rivets; 88a—downward pivoting direction;

88b—outward sliding direction; 88c—"shoveling-like" motion;

88d—upward pivoting direction; 90—constant force spring; 92—spring mounting buckle;

94—spring fastener; 96—"V"—shaped gripping plate

DETAILED DESCRIPTION—FIGS. 1 THROUGH 5A—PREFERRED EMBODIMENT

As shown in the drawings for purposes of illustration, the present invention is concerned with an adjustable carrying device, generally referred to by the reference number 12, which allows the use of a single human hand in the gripping, lifting and carrying of objects having opposed parallel surfaces and generally requiring both human arms and hands to be carried.

With reference to FIG. 1, the adjustable carrying device 12 comprises a first and a second gripping member 14 and 16, pivotally and slidably connected to each other for engaging object 18 between gripping plates 20a and 20b.

Figure 2:
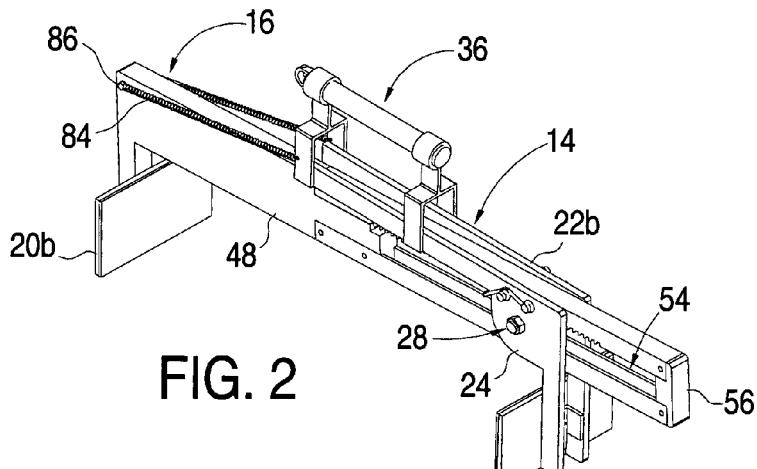
FIG. 2 is a top perspective view of the adjustable carrying device formed in accordance with the teachings of a preferred embodiment of the invention.
Figure 2A:
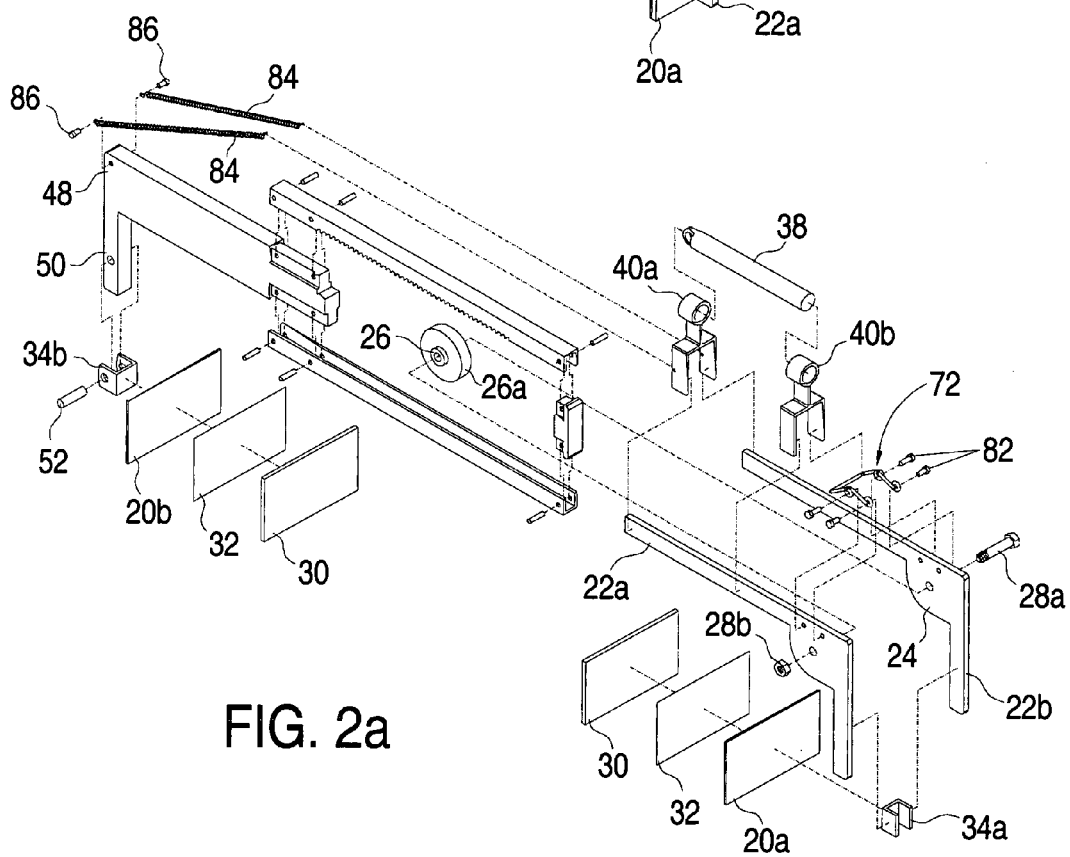
FIG. 2a is an exploded perspective view of the adjustable carrying device illustrated in FIG. 2.

As shown in FIGS. 2 and 2a, first gripping member 14 comprises a pair of substantially L-shaped levers 22a and 22b cut from a sheet of rigid material (e.g., metal). Each lever has a horizontally disposed first end, a vertically disposed second end and a web 24 diagonally extending intermediate of, and further joining, both ends. Levers 22a and 22b are spaced by a bushing 26 and joined by an attachment member 28 inserted through concentrically aligned through-holes on each web 24 and along the length of bushing 26.

In the preferred embodiment, bushing 26 is made from high density polyethylene (HDPE) and attachment member 28 is a bolt 28a and nut 28b with threads combination. Gripping plates 20a and 20b have a front surface with a rubberized pad 30 adhered thereon, by means of an adhesive coating 32. Gripping plates 20a and 20b further have a back surface with mounting brackets 34a and 34b, respectively, adhered thereto.

In the preferred embodiment, gripping plates 20a and 20b are cut from a flat rectangular cross-sectional metal sheet. However, the gripping plates can be cut from bar stock with "V"-shaped or arcuate cross-sectional configuration. Mounting brackets 34a and 34b are cut and machined from a channel cross-sectional metal bar stock. The bases of mounting brackets 34a and 34b are welded to the back surface of gripping plates 20a and 20b, respectively. The legs of mounting bracket 34a are sandwiched between, and welded to, the second ends of levers 22a and 22b.

A handle assembly 36 comprises a handgrip 38 connected to, and above, the first ends of levers 22a and 22b by a pair of handle brackets 40a and 40b. In the preferred embodiment, handgrip 38 is made from a high density polyethylene (HDPE) rod and is provided with a loop or eye at one end for receiving a hook associated with a mechanical lifting device (not shown).

Figures 3, 3A:
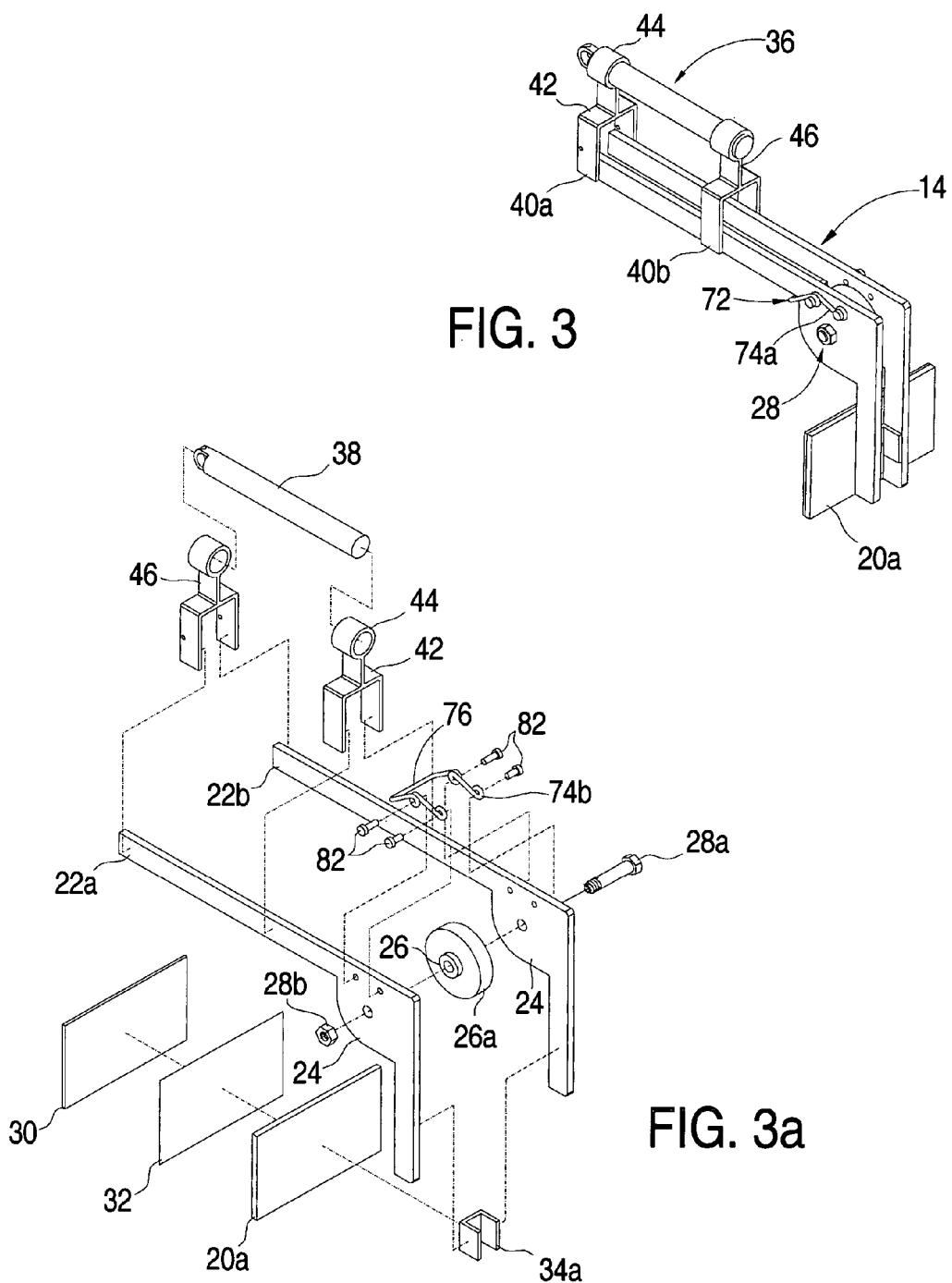
FIG. 3 shows a top perspective view of a first gripping member of the adjustable carrying device where the second gripping member has been omitted for increased clarity of parts illustration.
FIG. 3a is an exploded perspective view of the first gripping member illustrated in FIG. 3.

Referring now to FIGS. 3 and 3a, each handle bracket 40a and 40b has a first and a second leg downwardly extending from a base 42. Neck 46 connects a collar 44 to each base 42. In the preferred embodiment, handle brackets 40a and 40b are cut, formed, and welded from a strip of rectangular cross-sectional metal bar stock. The first leg of handle brackets 40a and 40b is welded to the first end of lever 22a and the second leg of handle brackets 40a and 40b is welded to the first end of lever 22b. Handgrip 38 has a cross-sectional diameter sized to be press-fitted into collars 44 and has both ends trunnioned therebetween.

With reference now to FIGS. 2 and 2a, second gripping member 16 comprises a horizontally disposed elongated member 48, having first and second ends. An end leg 50 downwardly extends from the first end of elongated member 48 at a right angle therefrom. In the preferred embodiment, elongated member 48 and end leg 50 are made from a sheet of rigid high tensile strength material (e.g., metal, HDPE) of rectangular cross-sectional configuration.

Elongated member 48 has vertically disposed front and back major surface areas, and horizontally disposed top and bottom minor surface areas. The lower portion of end leg 50 is sandwiched with a loose fit between the legs of mounting bracket 34b. Through-holes on the legs of mounting bracket 34b align with a through-hole in the lower portion of end leg 50 for receiving a pivoting member 52 disposed therethrough.

A clearance about ¼ exists between the back surface of gripping plate 20b and end leg 50 to allow gripping plate 20b to pivot within 15 degrees from a parallel alignment with end leg 50. In the preferred embodiment, pivoting member 52 is trunnioned between through-holes in mounting bracket 34b. Gripping plate 20b can be replaced with gripping plates of different front surface shapes, by removing and re-installing pivoting member 52.

As best shown in FIGS. 2, 2a, 4 and 4a, a guide track 54 longitudinally extends from the second end of elongated member 48. Comprising guide track 54 is elongated member 48 at one side, a connecting member 56 at another side, and a top and a bottom channel members 58 and 60, respectively.

Channel members 58 and 60 are vertically spaced in opposing fashion defining the track along which bushing 26 spins and slides. In the preferred embodiment, channel members 58 and 60 are made from aluminum extrusion ⅛" thick. A first end of each of channel members 58 and 60 is attached to the top and bottom minor surface areas, respectively, of the second end of elongated member 48.

Channeled cross-sectional cutouts 62 extend along the top and bottom minor surface areas of the second end of elongated member 48 for saddle mounting of channel members 58 and 60, respectively. A pair of through-holes across the first ends of channel members 58 and 60 aligns with through-holes across cutouts 62 for receiving press-fit pins 64 disposed therethrough.

A plurality of evenly spaced teeth 66 are installed, machined or formed along the legs of a center portion of top channel member 58. Teeth 66 are pointing downwards towards bottom channel member 60.

Figure 4:
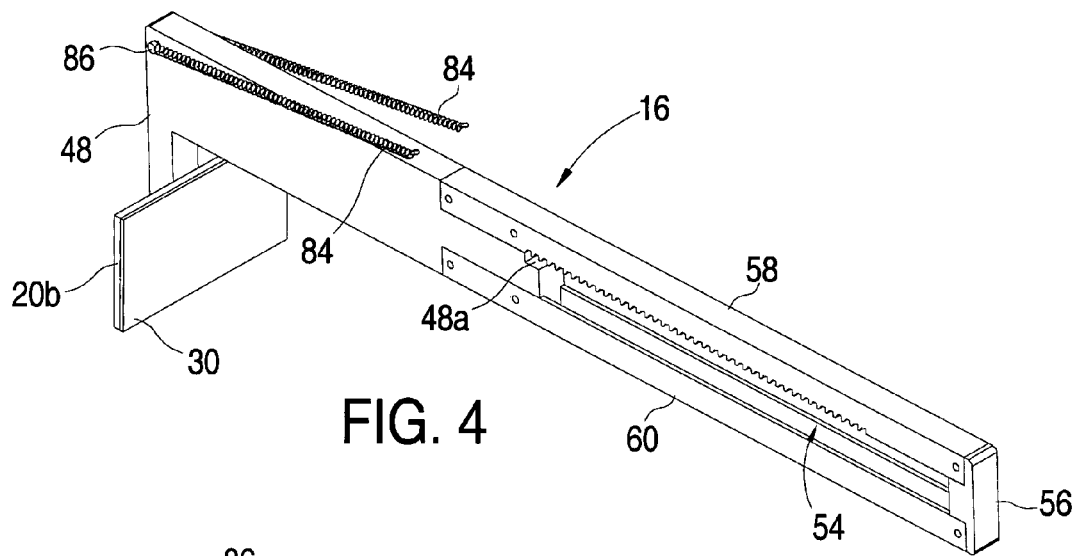
FIG. 4 shows a top perspective view of a second gripping member of the adjustable carrying device where the first gripping member has been omitted for increased clarity of parts illustration.
Figure 4A:
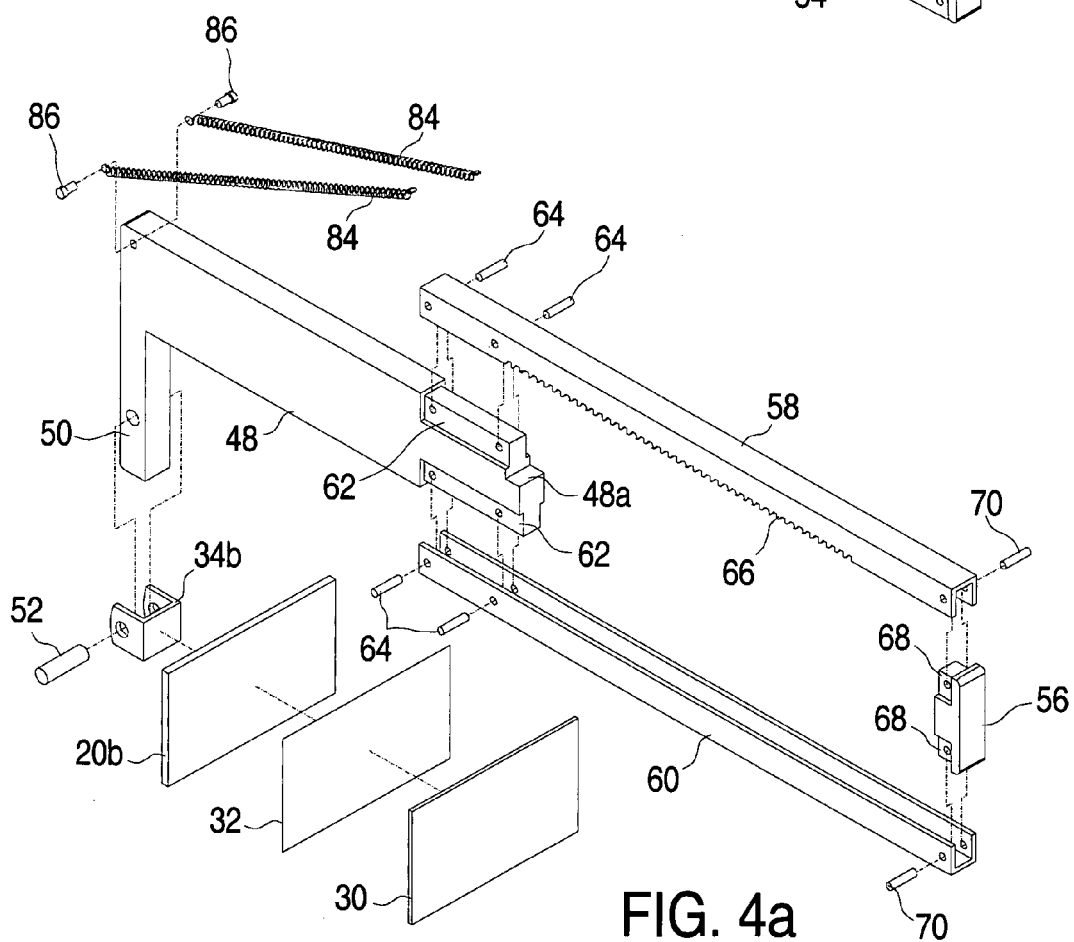
FIG. 4a is an exploded perspective view of the second gripping member illustrated in FIG. 4.

As best shown in FIGS. 2, 2a and 4a, bushing 26 has a larger diameter center portion 26a sized to fit loosely, for free sliding and spinning, inside guide track 54. The overall length of bushing 26 is slightly larger than the cross-sectional width of channel members 58 and 60. This allows guide track 54 to be positioned between, but not in contact with, levers 22a and 22b.

In the preferred embodiment as shown in FIG. 4a, connecting member 56 is made from a sheet of rigid material of high tensile strength (e.g., metal, HDPE) of rectangular cross-sectional configuration. Connecting member 56 has vertically disposed front and back major surface areas and horizontally disposed top and bottom minor surface areas. A second end of each of channel members 58 and 60 is attached to the top and to the bottom minor surface areas, respectively, of connecting member 56.

Channeled cross-sectional cutouts 68 extend along the top and bottom minor surface areas of connecting member 56 for saddle mounting of channel members 58 and 60, respectively. A through-hole across the second ends of channel members 58 and 60 align with a through-hole across cutouts 68 for receiving press-fit pins 70 disposed therethrough.

As best shown in FIGS. 1a, 2, 2a, 3, and 3a, a dual torsion spring assembly 72, carried by first gripping member 14, comprises a pair of torsion springs 74a and 74b, transversely joined by cross member 76. The cross sectional diameter of cross member 76 is sized to fit between teeth 66.

Each of torsion springs 74a and 74b further has an eye coil 78 and a hook-ending arm 80. The inner diameters of eye coil 78 and hook-ending arm 80 are sized to receive a rivet-type fastener 82, disposed therethrough. Torsion springs 74a and 74b are secured above respective webs 24 of levers 22a and 22b by rivets 82 in such a way that cross member 76 is disposed underneath the first ends of levers 22a and 22b through guide track 54.

Figure 5:
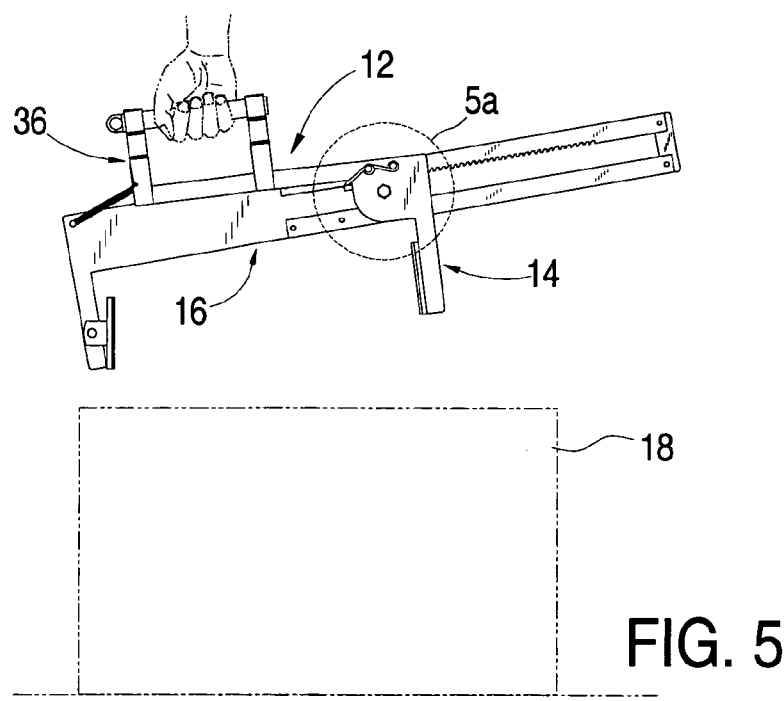
FIG. 5 is a side plan view of a preferred embodiment of the adjustable carrying device in "locked-relaxed" position being disposed by the user above the object to be carried.
Figure 5A:
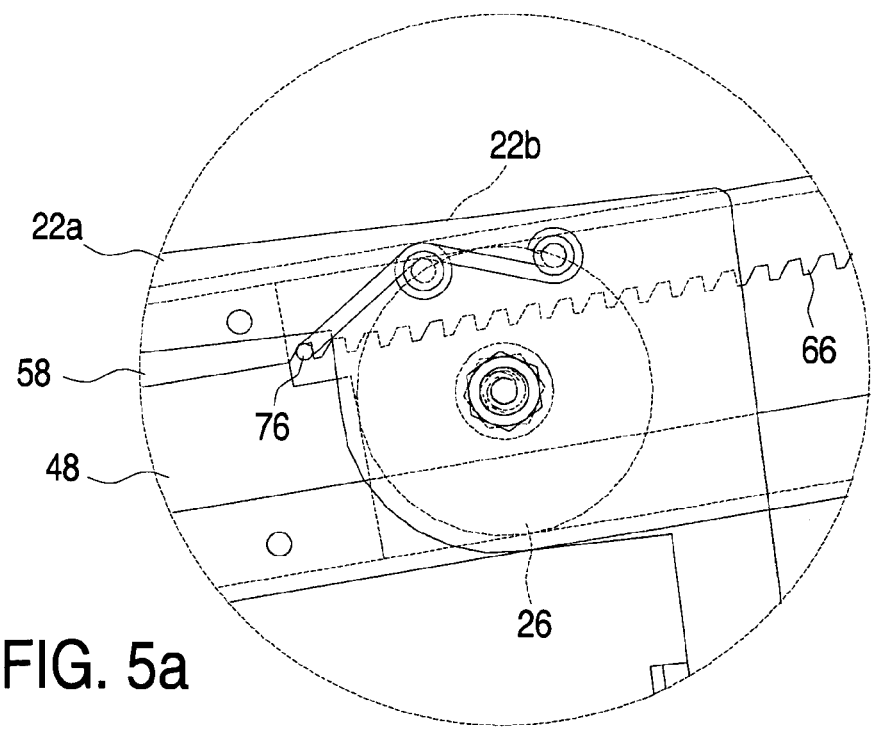
FIG. 5a is an enlarged view of the locking mechanism depicted by the dashed circle of FIG. 5 in engagement attitude to prevent the sliding of the gripping members, in relation to each other, while the device is being carried by the user.

As shown in FIGS. 4a, 5 and 5a, a rectangular cutout 48a is made at the top minor surface area of the second end of elongated member 48. Cross member 76 is received within cut-out 48a at the end of the inward linear travel of first gripping member 14.

In the preferred embodiment, and as shown in FIGS. 2 and 2a, biasing means consisting of a pair of coil springs 84 join first and second gripping members 14 and 16. Coil springs 84 resiliently oppose the outward linear travel of first gripping member 14 in relation to second gripping member 16.

In another embodiment, a single constant force spring, joining gripping members 14 and 16, can be used in place of coil springs. Each coil spring 84 has a first loop end sized to receive a rivet-type fastener 86 disposed therethrough. Rivets 86 secure the first loop end of each of coil springs 84 to the back and front major surface areas, respectively, of the first end of elongated member 48.

A second loop end of each of coil springs 84 is coiled through a through-hole in the first and second legs, respectively, of handle bracket 40a.

Operation—Preferred Embodiment—FIGS. 5 through 9a

The method of using adjustable carrying device 12 is sequentially illustrated in FIGS. 5 through 9a. As shown in FIGS. 5 and 5a, when the first ends of levers 22a and 22b are pivotally disposed above teeth 66, cross member 76 rests against top channel member 58 between teeth 66.

The carrier holds the adjustable carrying device 12 by handle assembly 36. Gravity causes the adjustable carrying device 12 to assume a "locked-relaxed" position (i.e., cross member 76 meshing with teeth 66 impeding the outward linear travel of first gripping member 14 in relation to second gripping member 16).

Figure 6:
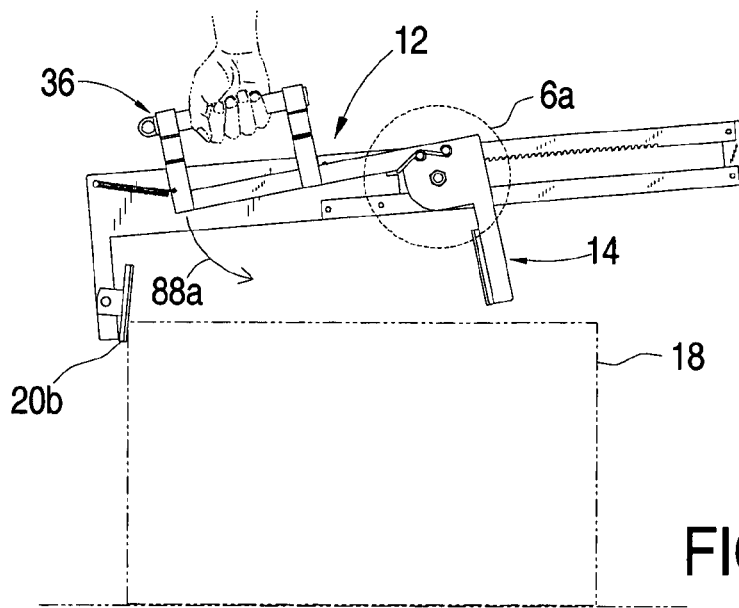
FIG. 6 is a side plan view of a preferred embodiment of the adjustable carrying device showing how the carrying device is brought to its "unlocked-relaxed" position by the user by laying the second gripping member against the object and downwardly pivoting the first gripping member.
Figure 6A:
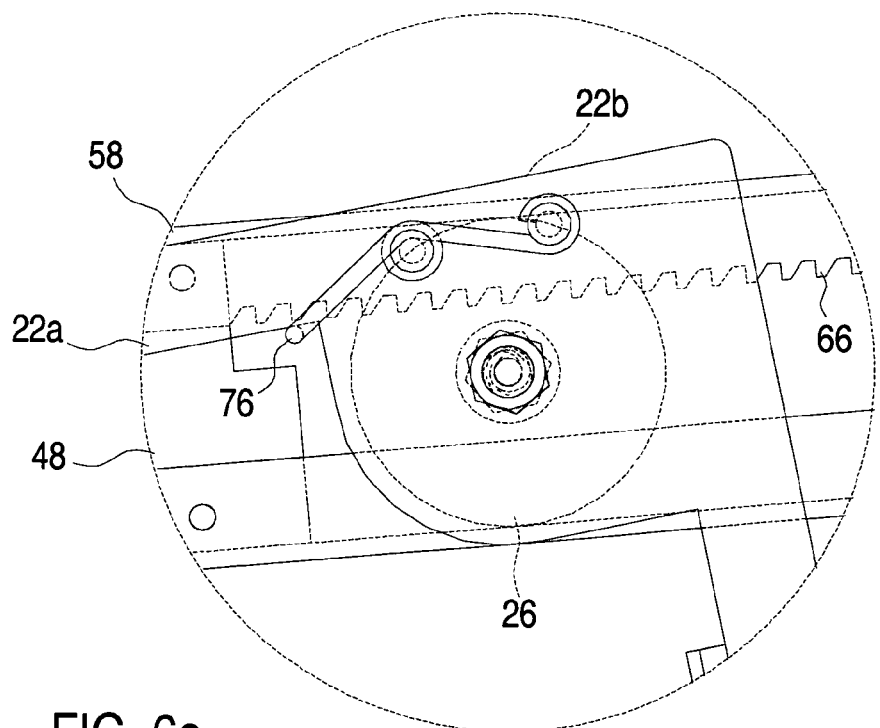
FIG. 6a is an enlarged view of the locking mechanism depicted by the dashed circle of FIG. 6 in disengagement attitude.

Referring now to FIGS. 6 and 6a, the carrier rests gripping plate 20b against the upper portion of the object's 18 surface nearest to gripping plate 20b. Handle assembly 36 is pivoted downwards in the direction 88a until first ends of levers 22a and 22b push cross member 76 away from between teeth 66. The adjustable carrying device 12 is now in its "unlocked-relaxed" position.

Figure 7:
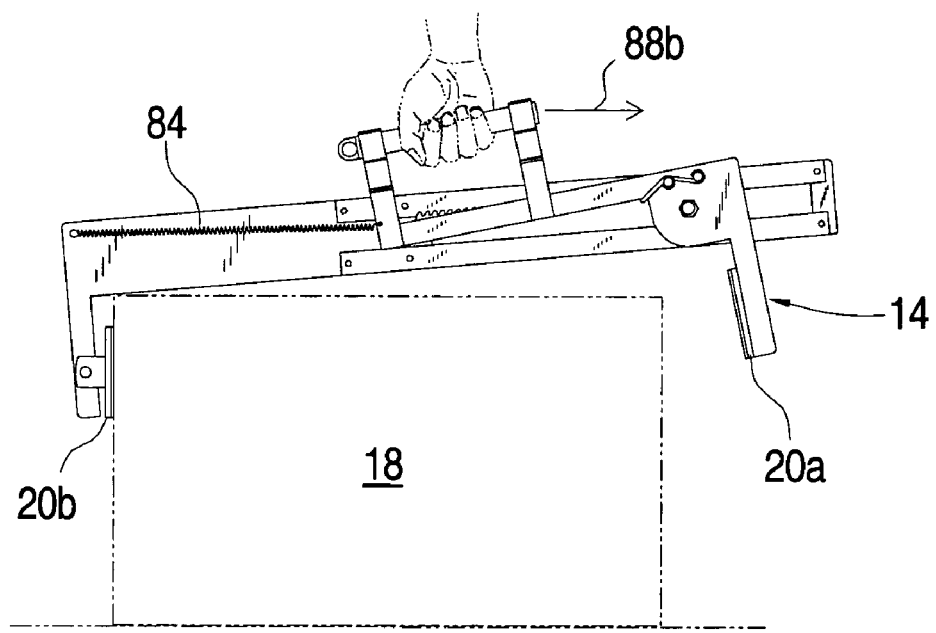
FIG. 7 is a side plan view of a preferred embodiment of the adjustable carrying device in "unlocked-relaxed" position being adjusted by the user into expanded attitude to receive the object between the gripping plates.

As illustrated in the non-limiting embodiment of FIG. 7, the carrier slides first gripping member 14 outwards in direction 88b. Gripping plates 20a and 20b are separated enough as to accept object 18 therebetween, while coil springs 84 stretch out. The adjustable carrying device 12 is now in expanded attitude.

Figure 8:
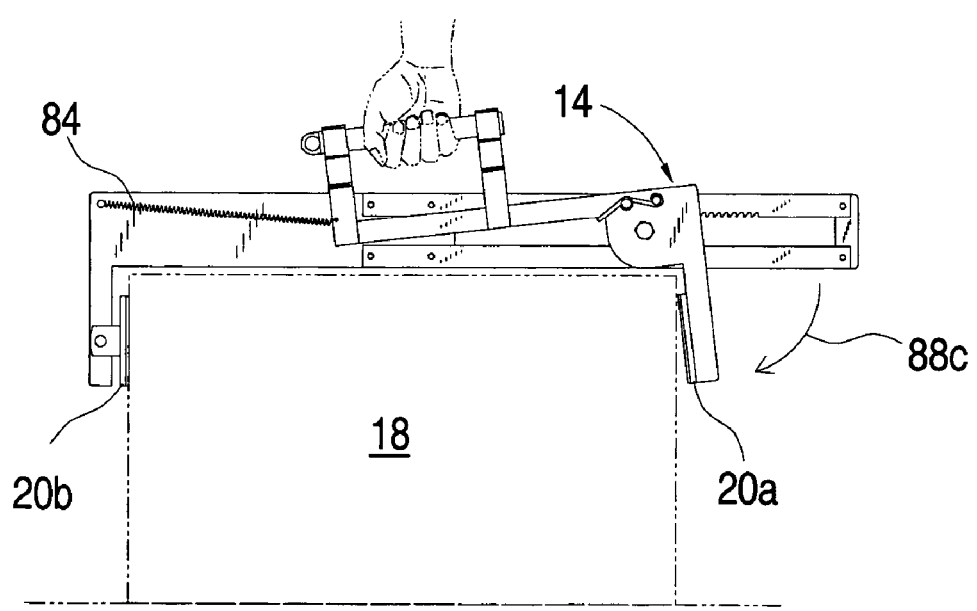
FIG. 8 is a side plan view of a preferred embodiment of the adjustable carrying device in "unlocked-relaxed" position where the coil springs assist the user in adjusting the first gripping member against the object.

As illustrated in the non-limiting embodiment of FIG. 8, the carrier brings gripping plate 20a down, in a "shoveling-like" motion 88c, against the upper portion of the object's 18 surface nearest to gripping plate 20a. Contracting coil springs 84 keeps gripping plate 20b against object 18 during a single handed inward sliding of first gripping member 14. Adjustable carrying device 12 is now in engaging attitude.

The adjustable carrying device 12 is particularly advantageous in the fact that it can be unlocked and adjusted to grip object 18, by its upper portion, using only one hand.

Not having to reach underneath object 18 with both hands significantly reduces the amount of back bending and possible back injury usually associated with gaining control of an object placed on the floor.

Figure 9:
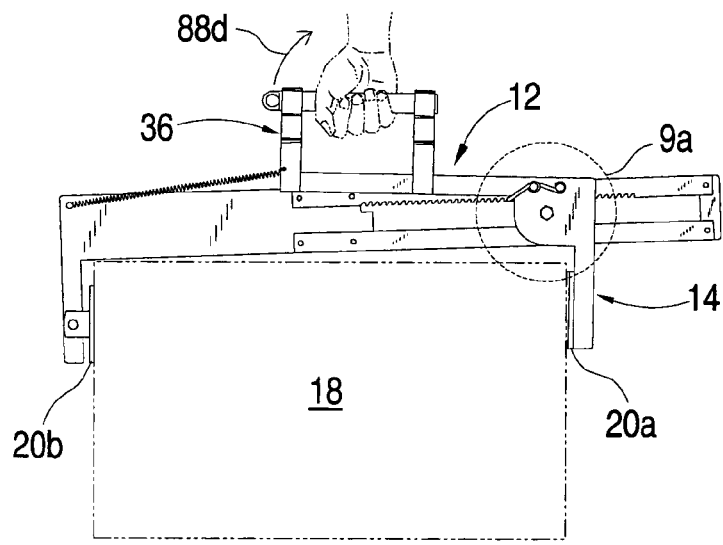
FIG. 9 is a side plan view of a preferred embodiment of the adjustable carrying device showing how the carrying device is brought to its "locked-gripping" position by upwardly pivoting the first gripping member and where a further upward pull results in the lifting of the object.
Figure 9A:
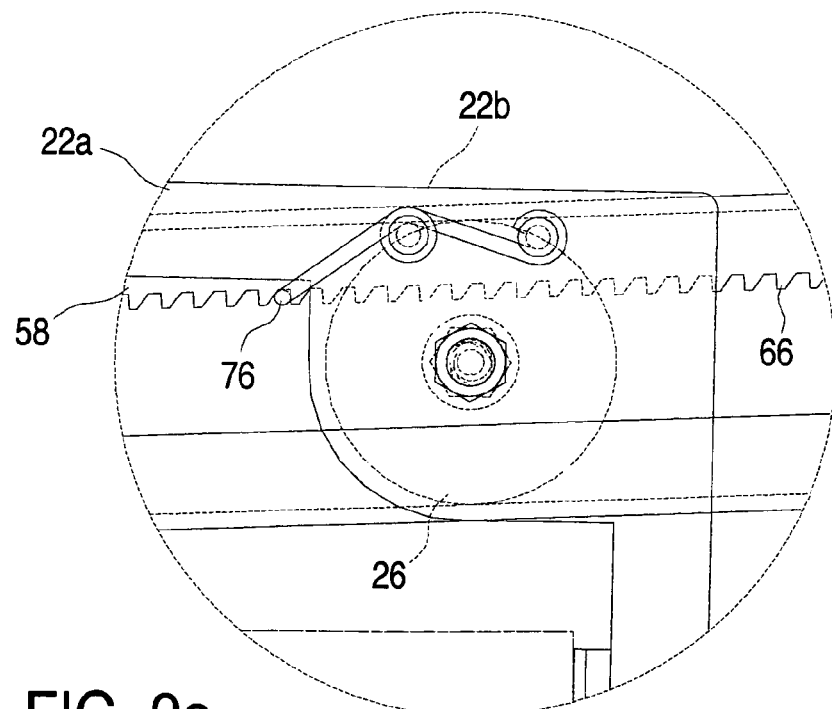
FIG. 9a is an enlarged view of the locking mechanism depicted by the dashed circle of FIG. 9 in engagement attitude.

Once both gripping plates have been adjusted against object 18, as illustrated in the non-limiting embodiment of FIGS. 9 and 9a the carrier pivots handle assembly 36 in upwards direction 88d, setting the adjustable carrying device 12 into a "locked-gripping" position (i.e., cross member 76 impeding first gripping member's 14 outward linear travel and gripping plates 20a and 20b pivotally approaching each other). Further upward pull on handle assembly 36 increases the gripping force until the pull force overcomes the object's weight, resulting in the lifting of the object.

The adjustable carrying device 12 is of further advantage in the fact that it can be locked into a grip with a subtle movement of one hand allowing to lift and carry object 18.

An additional advantage of the present invention is that the adjustable carrying device 12 allows object 18 to be carried at a side of the carrier and not in the front. Carrying a rather large object in the front of the carrier can be extremely dangerous when climbing or going down a stair. Another important advantage of the present invention is that the rubberized gripping pads 30 do not scratch, damage, or puncture any of the object's 18 surfaces.

In addition, object 18 can only be released from between gripping plates 20a and 20b with a downward pivoting motion of handle assembly 36 which deactivates the locking mechanism. This requires object 18 to be placed on a surface, assuring object 18 will not be dropped during transport.

Figure 10:
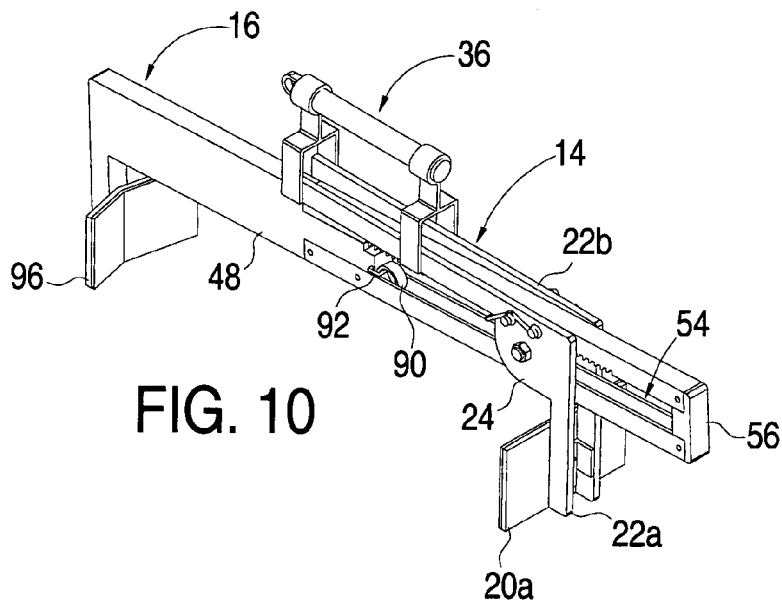
FIG. 10 is a top perspective view of an alternative embodiment of the adjustable carrying device where the coil springs and the flat gripping plate of the second gripping member have been replaced by a constant force spring and a "V"-shaped gripping plate, respectively.
Figure 10A:
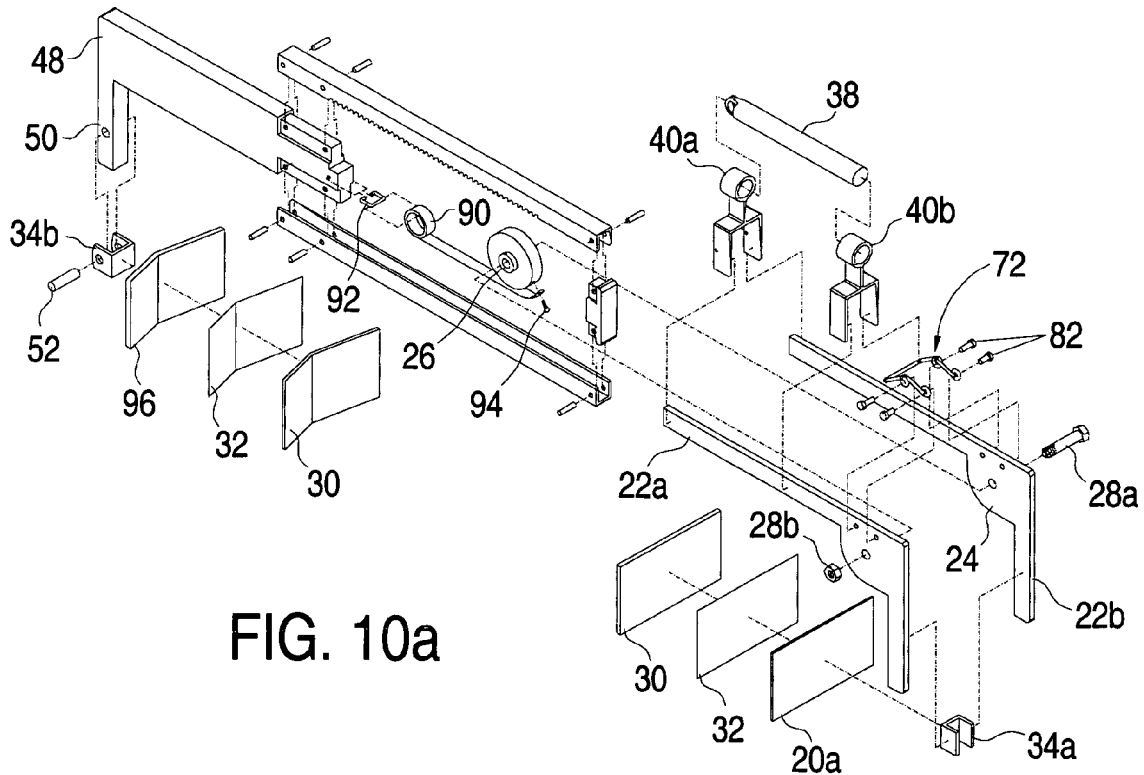
FIG. 10a is an exploded perspective view of the alternative embodiment of the adjustable carrying device illustrated in FIG. 10.

Description—Additional Embodiment—FIGS. 10 and 10a

As illustrated in the alternative embodiment of FIGS. 10 and 10a, a constant force spring 90 joins elongated member 48 to bushing 26. A "C"-shaped spring mounting buckle 92, is used to rotatably mount constant force spring 90 to the second end of elongated member 48. A screw-type fastener 94, inserted through a hole at one end of constant force spring 90, attaches the end of constant force spring 90 to bushing 26. As best shown in FIG. 10 constant force spring 90 has a width and an external diameter sized to fit within guide track 54. A "V"-shaped gripping plate 96 is also shown in FIGS. 10 and 10a as a change part for an increased contact surface area between the adjustable carrying device 12 and cylindrical objects. Gripping pad 30 and adhesive coating 32 are shown in accordance to the "V"-shaped gripping plate 96.

Operation—Additional Embodiment—FIGS. 10 and 10a

The method of operation of the alternative embodiment shown in FIGS. 10 and 10 is similar to that of method of operation shown in FIGS. 5 through 9a. In this alternative embodiment it is a "V"-shaped gripping plate 96 which is positioned against a cylindrical object's surface (not shown) that is nearest to gripping plate 96. Also, in this alternative embodiment, it is a contracting constant force spring 90 which keeps gripping plate 96 against the cylindrical object during a single handed inward sliding of first gripping member 14.

It should be understood that the invention is not limited to the exact embodiment or construction which has been illustrated and described but that various changes may be made without departing from the spirit and the scope of the invention.

What is claimed is:

1. An adjustable carrying device for a single handed grasping, lifting and transporting of an object which has at least two parallel opposed surfaces and a width between said parallel opposed surfaces, said carrying device comprising:
    a first and a second gripping member pivotally and slidably connected to each other;
    a gripping plate having a mounting bracket attached to a back surface and a front surface carried by each gripping member in opposing fashion for receiving said object therebetween;
    a pair of generally L-shaped levers carried by said first gripping member fixed in parallel alignment to one another by an attachment member inserted through a spacer bushing;
    an elongated member carried by said second gripping member having first and second ends;
    an end leg downwardly extending from said first end of said elongated member at a right angle thereof;
    a guide track longitudinally extending from said second end of said elongated member for housing said spacer bushing therewithin in a manner that allows said spacer bushing to slide and spin along said guide track;
    a plurality of evenly spaced elements downwardly protruding from a top portion of said guide track;
    locking means carried by said levers structurally cooperating with said evenly spaced elements for impeding the outward linear travel of said first gripping member in relation to said second gripping member;
    biasing means connecting said gripping members for urging said gripping members against said received object;
    a handle assembly comprising a pair of handle brackets spaced by a handgrip carried by said first gripping member for sliding and pivoting said first gripping member in relation to said second gripping member and for holding said adjustable carrying device;
    wherein a downward pivotal movement of said handle assembly deactivates said locking means allowing said gripping plates to be adjusted against said received object and wherein a subsequent upward pivotal movement of said handle assembly activates said locking means, impeding the outward linear travel of said first gripping member and causing said gripping plates to be pivotally forced towards each other thereby gripping the object to be lifted.

2. The adjustable carrying device of claim 1 wherein said guide track comprises connecting member at one side, said elongated member at another side, a top channel member comprising said evenly spaced elements, and a bottom channel member.

3. The adjustable carrying device of claim 2 wherein said top and bottom channel members have first and second ends vertically spaced and attached to said second end of said elongated member and to said connecting member, respectively.

4. The adjustable carrying device of claim 3 wherein said first and second ends of said top and bottom channel members are attached to said elongated member and to said connecting member by fastening means are selected from the group comprising at least one of: press-fit pins, rivets, or a combination thereof.

5. The adjustable carrying device of claim 1 wherein each of said levers has first and second ends disposed at a right angle from each other, a web diagonally extending intermediate of, and further joining, said first and second ends and a through-hole near the mass center of said web for receiving said attachment member.

6. The adjustable carrying device of claim 1 wherein said gripping plate of said first gripping member joins said second ends of said levers and said gripping plate of said second gripping member is removably and pivotally connected, by a pivoting member, to said end leg of said elongated member.

7. The adjustable carrying device of claim 1 wherein said handgrip has a loop in at least one end and is connected to said levers by said handle brackets, each handle bracket having a pair of legs downwardly extending from a base, and a collar connected to said base by a neck for receiving one end of said handgrip through each of said collars, respectively.

8. The adjustable carrying device of claim 7 wherein one leg of each of said handle brackets is attached to said first end of one said lever and another leg of said handle brackets is attached to said first end of another said lever for movement in unison of said levers through said handgrip.

9. The adjustable carrying device of claim 1 wherein said locking means comprises a pair of torsion springs transversely joined at a first arm by a cross member, each of said torsion springs further having an eye coil and a second hook-ending arm.

10. The adjustable carrying device of claim 9 wherein fastening means secure said torsion springs to said levers in such a way that said cross member is disposed underneath said first ends of said levers through said guide track.

11. The adjustable carrying device of claim 10 wherein said fastening means are disposed through said eye coil and said second hook-ending arm of each of said torsion springs and are selected from the group comprising at least one of: rivet-type fasteners nut and bolt fasteners, or any combination thereof.

12. The adjustable carrying device of claim 9 wherein said cross member is biased upwards by said torsion springs and has a cross-sectional diameter sized to fit between said evenly spaced elements.

13. The adjustable carrying device of claim 12 wherein said cross member structurally cooperates with said evenly spaced elements when said handle assembly is pivoted upwards and wherein said cross member is pushed away from between said evenly spaced elements, by said first ends of said levers, when said handle assembly is pivoted downwards.

14. The adjustable carrying device of claim 1 wherein said biasing means comprise a pair of tension coil springs, each having first loop ends coiled through through-holes on at least one of said handle brackets and second loop ends attached with rivet-type fasteners to said elongated member above said end leg.

15. The adjustable carrying device of claim 1 wherein said biasing means comprises a constant force spring attached to said first and second gripping members by fastening means selected from the group comprising at least one of: screw-type fasteners, mounting buckles, or any combination thereof for allowing said constant force spring to stretch and contract during the sliding of said first gripping member in relation to said second gripping member.

16. A method for a user to use an adjustable carrying device for a single handed grasping, lifting and transporting of an object which has a least two parallel opposed surfaces and a width between said parallel opposed surfaces, said adjustable carrying device having first and second gripping members pivotally and slidably connected to each other and having complementary gripping plates urged towards said object by biasing means connecting said gripping members and selected from the group comprising at least one of: tension coil springs, constant force springs, or any combination thereof, said first in member having locking means comprised of a pair of torsion springs transversely joined by a cross member in cooperation with evenly spaced elements within a guide track carried by said second gripping member, said first gripping member further having a pair of levers spaced by a bushing and joined by an attachment member, said spacer bushing being housed within said guide track, and a handle assembly for selectively and pivotally activating and deactivating said locking means, said method comprising the steps of:

providing said adjustable carrying device;
    placing said gripping plate of said second gripping member against the object's parallel surface nearest to said gripping plate of said second gripping member;
    applying a downward force on said handle assembly for deactivating said locking means allowing the outward sliding motion of said first gripping member in relation to said second gripping member, thereby increasing the space between said gripping plates enough as to accept said object therebetween;
    sliding said first gripping member towards said object, assisted by said biasing means, so as to place said gripping plate of said first gripping member against the object's parallel surface nearest to said gripping plate of said first gripping member; and
    applying an upward force on said handle assembly to activate said locking means and impede the outward sliding motion of said first gripping member in relation to said second gripping member thereby pivotally forcing said gripping plates towards each other and against said object to clamp and lift said object.

17. The method as defined in claim 16 wherein said biasing means is selected from the group comprising at least one of: tension coil springs, constant force springs, or any combination thereof.

18. The method as defined in claim 16 wherein said pair of torsion springs are attached to said levers by fastening means selected from the group comprising at least one of: rivet-type fasteners, nut and bolt fasteners, or any combination thereof to dispose said cross member underneath one end of said levers, through said guide track so that said cross member structurally cooperates with said evenly spaced elements.

19. The method as defined in claim 16 wherein a upward pivoting motion of said handle assembly causes said pair of torsion springs to pull said cross member up against and between said evenly spaced elements for engagement of said locking means and wherein a downward pivoting motion of said handle assembly causes said levers to push down onto said cross member away from between said evenly spaced teeth elements for disengagement of said locking means.

* * * * *